United States Patent
Waldbauer, Jr.

[11] Patent Number: 5,981,686
[45] Date of Patent: Nov. 9, 1999

[54] SPANDEX MADE WITH 1,3-DIAMINOPENTANE

[75] Inventor: Robert Otto Waldbauer, Jr., Waynesboro, Va.

[73] Assignee: E. I. du Pont de Nemours and Company, Wilmington, Del.

[21] Appl. No.: 09/048,809

[22] Filed: Mar. 26, 1998

[51] Int. Cl.[6] .......................... C08G 18/32; C08G 18/42; C08G 18/48

[52] U.S. Cl. ................. 528/76; 528/61; 528/80; 528/83; 528/906

[58] Field of Search .................. 528/61, 76, 80, 528/83, 906

[56] References Cited

U.S. PATENT DOCUMENTS

| | | | |
|---|---|---|---|
| 3,097,192 | 7/1963 | Schilit | 528/61 |
| 5,352,733 | 10/1994 | Hart | 524/840 |
| 5,389,430 | 2/1995 | Yilgor et al. | 428/246 |
| 5,461,122 | 10/1995 | Yilgor et al. | 525/474 |
| 5,472,634 | 12/1995 | Hart | 252/193 |
| 5,521,273 | 5/1996 | Yilgor et al. | 528/66 |
| 5,665,269 | 9/1997 | Hart | 252/193 |

FOREIGN PATENT DOCUMENTS 3-279415  12/1991  Japan.

*Primary Examiner*—Rabon Sergent
*Attorney, Agent, or Firm*—George A. Frank

[57] ABSTRACT

A polyurethaneurea polymer and spandex spun therefrom, based on polymeric ester or ether glycols and MDI at certain capping ratios, and 1,3-diaminopentane chain extender, are provided.

7 Claims, No Drawings

SPANDEX MADE WITH 1,3-DIAMINOPENTANE

BACKGROUND OF THE INVENTION

1. Field of the Invention

The present invention relates to new polyurethaneureas and spandex made therefrom and, more particularly, to polyurethanureas which have been chain-extended with 1,3-diaminopentane.

2. Description of Background Art 1,3-Diaminopentane has recently become commercially available. No prior disclosure of its use in making spandex is known. Japanese Published Patent Application No. 03-279415 (1991) discloses the use of asymmetric diamines at levels of up to 30 mole % in mixtures with symmetrical diamines to provide good solution viscosity stability. U.S. Pat. No. 5,472,634 to Hart, discloses the use of 1,3-diaminopentane in an amount of 15–30 mole % of the total chain extenders to make water-based polyurethaneurea dispersions for coatings.

SUMMARY OF THE INVENTION

The composition of the present invention is a polyurethaneurea polymer based on:

- a polymeric glycol selected from polyether glycols and polyester glycols wherein the polyether glycol is selected from the group consisting of a homopolymer of tetrahydrofuran (THF) and a copolymer of tetrahydrofuran and 3-methyltetrahydrofuran (3-MeTHF);
- 1,1'-methylenebis(4-isocyanatobenzene); and
- diamine chain extender(s) wherein at least one diamine is 1,3-diaminopentane (1,3-DAP) present to an extent of at least 5 mole % of the mixture of diamines and the remainder is ethylenediamine;
- wherein the range of capping ratios depends on the amount of 1,3-DAP present in said mixture of diamines and on the type of glycol and is determined as follows:

|  | 1,3-DAP | capping ratio |
| --- | --- | --- |
| homopolymer of THF | 5–<50 | 1.50–1.90 |
|  | ≧50–90 | 1.60–2.50 |
| copolymer of THF and 3-MeTHF | 5–<50 | 1.65–2.50 |
|  | ≧50–90 | 2.20–3.70. |

DETAILED DESCRIPTION OF THE INVENTION

Fabrics or yarns which contain spandex and nonelastomeric fibers are typically treated with heat or steam to "set" the fabric or yarn. This gives the fabric or yarn good dimensional stability and shapes the finished garment. Good steam- and heat-set efficiency allows shorter setting times and/or lower setting temperatures. As a result, the setting process can be operated more economically, and fabrics and yarns can be set even if they contain fibers which will tolerate only lower temperatures.

"Spandex", as used herein, has its customary meaning, that is, a manufactured fiber in which the fiber-forming substance is a long chain synthetic elastomer comprised of at least 85% by weight of a segmented polyurethane.

The polyurethane is generally prepared by reacting a polymeric glycol with a diisocyanate to form an NCO-terminated prepolymer, or "capped glycol", dissolving the capped glycol in a suitable solvent such as dimethylacetamide ("DMAc"), dimethylformamide, or N-methylpyrrolidone, and reacting the capped glycol with one or more difunctional chain extenders. Polyurethaneureas are formed when the chain extenders are diamines. The molar ratio of diisocyanate to polymeric glycol is called the "capping ratio". A minor amount of monofunctional secondary amine such as diethylamine can be added with the chain extender to control molecular weight. The polymer solution can then be dry- or wet-spun to form spandex.

It has now been found that 1,3-diaminopentane (1,3-DAP) can be used at a level of at least about 5 mole % with other diamine chain extenders to give spandex with improved properties which can be varied to suit the needs of the user by varying the level of 1,3-diaminopentane. It has been further found surprisingly that using 1,3-DAP at a level of at least about 35 mole %, with any remaining chain extender being ethylene diamine, gives spandex having superior steam- and heat-settability. Levels of at least about 60 mole % 1,3-diaminopentane are preferred, due to the higher steam- and heat-settability that can be attained. When another chain extender is used with 1,3-diaminopentane, that chain extender is ethylenediamine. In order to control the molecular weight of the polyurethane, minor amounts of primary and/or secondary monoamines can be added. Such chain terminator amines can generally be added as a mixture with the chain extenders. Diethylamine is preferred. Optionally, a minor amount of crosslinking can be provided by including a small amount of a trifunctional amine such as diethylenetriamine in the chain extender/chain terminator mixture.

Suitable polymeric glycols for the practice of the present invention are polyester diols and polyether diols. The latter can be derived from tetrahydrofuran, 3-methyltetrahydrofuran, and copolymers thereof. When such a copolymer is used, the amount of 3-methyltetrahydrofuran present can be in the range of about 4–20 mole % and, preferably, in the range of about 10–15 mole %.

Glycol-terminated polyesters are also useful for preparing the spandex of the present invention. These include the reaction products of ethylene glycol, tetramethylene glycol, butylenediol, diethylene glycol, and/or 2,2-dimethyl-1,3-propanediol and the like with diacids such as adipic acid, succinic acid, 1,12-dodecanedioic acid, and copolymers thereof. Polyester glycols derived from the ring opening of $\epsilon$-caprolactone and $\delta$-valerolactone can also be used. The polymeric reaction product of 2,2-dimethyl-1,3-propanediol with 1,12-dodecanedioic acid, which is poly(2,2-dimethylpropylene dodecanoate), and the copolymeric reaction product of ethylene glycol, butylenediol, and adipic acid, which is poly(ethylene-co-butylene adipate), are preferred.

The diisocyanate used in this invention is 1,1'-methylenebis(4-isocyanatobenzene) (MDI).

The capping ratios used in the present invention are in the range of about 1.5–3.7. The capping ratio is increased as the proportion of 1,3-diaminopentane in a mixture of chain extenders is increased. If the capping ratio is too low, the polyurethaneurea is difficult to spin into spandex. If the capping ratio is too high, the elongation-at-break of the spandex is too low. When the polymeric glycol is a homopolymer of THF and 1,3-diaminopentane is present to an extent of approximately 50–90 mole % of the total chain extender, the capping ratio is in the range of about 1.6–2.5. When the polymeric glycol is a copolymer of tetrahydrofuran and 3-methyltetrahydrofuran and 1,3-diaminopentane is present to an extent of approximately 50–90 mole % of the total chain extender, the capping ratio is in the range of about 2.2–3.7.

The following test methods were used:

Total isocyanate content of the capped glycols was measured by the method of S. Siggia, "Quantitative Organic Analysis via Functional Group", 3rd Edition, Wiley & Sons, New York, pages 559–561 (1963).

The strength and elastic properties of the spandex were measured in accordance with the general method of ASTM D 2731-72, using an Instron tensile tester (Instron Corp., Canton Mass.). Three filaments, a 2-inch (5-cm) gauge length and a 0–300% elongation cycle were used for each of the measurements. The samples were cycled five times at a constant elongation rate of 50 cm per minute. Load power, the stress on the spandex during initial extension, was measured on the first cycle at 200% extension and is reported in millinewtons per tex. Unload power is the stress at an extension of 200% for the fifth unload cycle and is also reported in millinewtons per tex. Percent elongation-at-break was measured on a sixth extension cycle.

To measure heat-set efficiency, the spandex samples were mounted on a 10-cm frame and stretched 3.5× (250%). The frame (with sample) was placed horizontally in an oven preheated to 190° C., for 90 seconds. The samples were allowed to relax and the frame to cool to room temperature. The samples, still on the frame, were immersed in boiling water for 30 min. The frame and samples were removed from the bath and allowed to dry. The length of the yarn samples was measured and heat-set efficiency was calculated from the following equation:

$$\% \; HSE = 100 \times \frac{\text{heat-set length} - \text{original length}}{\text{stretched length} - \text{original length}}$$

Each sample was tested four times, and the results were averaged.

To determine steam set, which is a measure that simulates hosiery processing and boarding operations, a sample of a chosen length in a straight non-tensioned condition, Yo, (conveniently 10 cm) was stretched to three times its original length for about 2 minutes and then relaxed. This simulated a covering operation in which the spandex was drafted while being covered with a conventional yarn. The thusly stretched and relaxed spandex test sample was then placed in a relaxed condition in a boiling water bath for 30 minutes. This exposure to boiling water simulates a dyeing operation. The sample was then removed from the bath, dried, and stretched to twice its post-bath relaxed length. While in this stretched condition, the sample was exposed for 30 seconds to an atmosphere of steam at 10 psig (69 KPa) 110° C. The steam treatment simulates hosiery boarding. After removal from the steam atmosphere, the sample was allowed to dry, and its straight non-tensioned length, Yf, was measured. Steam set (%SS) was then calculated according to the formula %SS=100(Yf-Yo)/Yo.

High percent steam set is a desirable characteristic.

Solution viscosity was determined in accordance with the general method of ASTM D1343-69 with a Model DV-8 Falling Ball Viscometer (Duratech Corp., Waynesboro, Va.), operated at 40° C.

EXAMPLES

In the Examples, the co-extender used with 1,3-diaminopentane (or other branched chain extenders in the case of Example 3) was ethylenediamine. The 1,3-diaminopentane used was "DYTEK" EP (a trademark of E. I. du Pont de Nemours and Company). In the Tables, %NCO is the free isocyanate in the capped glycol, C.R. is the capping ratio, Eb is elongation-at-break, SS is steam set, HSE is heat-set efficiency, LP is load power and UP is unload power.

EXAMPLE 1

A. In a nitrogen-filled glove box, 362.85 grams of poly-tetramethyleneether glycol (Terathane® 1800, a registered trademark of E. I. du Pont de Nemours and Company, number average molecular weight of 1800) and 10 ml toluene were placed in a polymer kettle. The mixture was heated to 112° C. with vigorous stirring for 15 minutes to remove any water as an azeotrope with the toluene. The glycol was then cooled to 60° C., and 114.30 g of MDI was added (capping ratio 2.26). The glycol/diisocyanate mixture was heated to 85° C. with moderate stirring for 90 minutes, resulting in a capped glycol prepolymer having 4.5% free isocyanate groups. The prepolymer was cooled to 60° C. at which time 67 lg of DMAc was added with vigorous stirring followed by a diamine chain extender solution (500.98 g, 1.0N in DMAc, 70 mole % 1,3-diaminopentane and 30 mole % ethylenediamine) and an amine terminator solution (17.50 g, 1.0N diethylamine in DMAc). The intrinsic viscosity of the polymer was 2.01 dl/g. The final polymer solution concentration was 30% solids in DMAc. One weight % of "Cyanox" 1790 (a hindered phenolic antioxidant [2,4,6-tris (2,6-dimethyl-4-t-butyl-3-hydroxybenzyl)isocyanurate] Cytec Industries, West Patterson, N.J.), based on polymer weight, was added and thoroughly mixed into the solution. The solution was conventionally dry-spun into 22 decitex monofilament spandex at 180 meters per minute.

B. Another spandex was prepared as in Example 1A, above, utilizing a chain extender mixture of 60 mole % 1,3-pentanediamine and 40 mole % ethylenediamine.

C. A third spandex was prepared as in Example 1A, above, but the capping ratio was 1.6 (%NCO 2.2 in the capped glycol) and the only chain extender was ethylenediamine, placing this material outside this invention.

The properties of these spandex fibers are shown in Table I.

TABLE I

| Sample | 1,3-DAP (mole %) | Eb (%) | SS (%) | HSE (%) | LP (mN/tex) | UP (mN/tex) |
|---|---|---|---|---|---|---|
| A | 70 | 562 | 60 | 120 | 6.1 | 2.0 |
| B | 60 | 569 | 50 | 108 | 4.5 | 1.5 |
| C | 0 | 648 | 41 | 89 | 5.6 | 1.9 |

Table I indicates that the spandex of the present invention has superior steam set and heat set efficiency, and its elongation, load power, and unload power are very good.

EXAMPLE 2

Polyurethanes were prepared from Terathane® 1800, 1,1'-methylene-bis(4-isocyanatobenzene), 2.3 capping ratio, 4.5% NCO in the capped glycol, and a chain extender mixture of 30 mole % ethylenediamine and 70 mole % of each of the diamines listed in Table II. The method used was as described in Example 1. "Cyanox" 1790 was added to the polymer solution at a level of 1 wt % based on polymer. Monofilament spandex (22 decitex) was conventionally dry-spun from DMAc solutions of the polyurethanes at 180 meters per minute. The steam set of each spandex was determined and is reported in Table II.

TABLE II

| DIAMINE | STEAM SET, % |
|---|---|
| 4-methyl-1,4 pentanediamine | 38 |
| 2-ethyl-1,4-butanediamine | 34 |
| 1,2-diamino-2-methylpropane | 47 |
| 1,3-diamino-2,2-dimethylpropane | 43 |
| 1,2-diaminopropane | 54 |
| 1,3-diaminopentane | 59 |

As can be seen from Table II, using 1,3-diaminopentane of this invention results in a spandex with superior steam-settability. Further, the spandex made with 1,3-DAP had low set (23%) while spandex made with 1,2-diaminopropane, outside this invention, had an undesirably high set of 43%.

EXAMPLE 3

A polyurethane was prepared from Terathane® 1800, 1,1'-methylene-bis(4-isocyanatobenzene) 2.0 capping ratio, 3.6% NCO, and a chain extender mixture of 90 mole % 1,3-diaminopentane and 10 mole % ethylenediamine. No additives were added to the polymer solution. Twenty-three decitex spandex was conventionally dry-spun from a DMAc solution of the polyurethane at 730 meters per minute. Elongation-at-break was 485%, steam set was 39%, load power was 3.5 mN/tex, and unload power was 1.3 mN/tex.

EXAMPLE 4

A polyurethane was prepared from Terathane® 1800, 1,1'-methylene-bis(4-isocyanatobenzene), 2.0 capping ratio, 3.6% NCO, and a chain extender mixture of 80 mole % 1,3-diaminopentane and 20 mole % ethylenediamine. No additives were used. Forty-four decitex spandex was conventionally dry-spun from a DMAc solution of the polyurethane at 730 meters per minute. Elongation-at-break was 488%, steam set was 45%, load power was 6.0 mN/tex, and unload power was 2.0 mN/tex.

Examples 3 and 4 illustrate the good fiber properties achievable by the spandex of the present invention at 1,3-diaminopentane extender levels as high as 80–90 mole %. Note that the spinning speeds here were much higher than in the other Examples; as a result the steam set results here cannot be compared directly with those found in the other Examples. Given the high spinning speeds, the steam set results are acceptable.

EXAMPLE 5

In a nitrogen-filled glove box, 75.50 g of a copolyether glycol based on 87 mole % tetrahydrofuran and 13 mole % 3-methyltetrahydrofuran monomers, number average molecular weight of 3530, and 10 ml toluene were placed in a polymer kettle. The mixture was heated to 112° C. with vigorous stirring for 15 minutes to remove any water in the glycol as an azeotrope with toluene. The glycol was then cooled to 60° C., and 19.48 g of MDI was added (capping ratio of 3.64). The glycol/diisocyanate mixture was heated to 100° C. with moderate stirring for 90 minutes, resulting in a capped glycol prepolymer having 5.0% free isocyanate groups. The prepolymer was cooled to 60° C. and 147.76 g of DMAc was added with vigorous stirring followed by a diamine chain extender solution (111.02 g, 1.0N in DMAc, made from 70 mole % 1,3-pentanediamine and 30 mole % ethylenediamine) and an amine terminator solution (3.50 g, 1.0N diethylamine in DMAc). No additives were used. Final polymer solution concentration was 28% solids in DMAc. Polymer intrinsic viscosity was 1.05 dl/g. The polymer solution was cast into films by pouring the solution onto a DuPont Mylar®-brand polyester film and drawing the solution into strips using a 0.015 mil doctor knife. DMAc was removed in a drying box swept with dry nitrogen in approximately 16 hours. The tops of the film were dusted with talcum powder and the film/polyester film composites were cut into 0.32 cm (0.125 inch)-wide by 12.7cm (5 inch)-long strips with a multiple bladed razor knife. Talcum powder was applied to the back of the film as it was lifted from the polyester surface. The stress-strain, steam set efficiency, hot-wet creep, and heat-set efficiency data are reported as Sample A in Table III.

Other polyurethaneureas of related compositions were prepared and cast into films; the test results are shown in Table III. In each case, the diisocyanate was MDI and ethylenediamine was used with 1,3-diaminopentane. The copolyether glycol contained 87 mole % tetrahydrofuran monomer and 13 mole % 3-methyl-tetrahydrofuran monomer, number average molecular weight of 3530, while the homopolyether was Terathane® 1800.

TABLE III

| Sample | Glycol | 1,3-DAP (mole %) | % NCO | C.R. | Eb % | SS % | HSE % | LP mN/tex | UP mN/tex |
|---|---|---|---|---|---|---|---|---|---|
| A | Copolyether | 70 | 5.0 | 3.6 | 570 | 71 | 90 | 5.2 | 2.0 |
| B | Copolyether | 70 | 4.5 | 3.3 | 570 | 61 | 93 | 4.0 | 1.9 |
| C | Homopolyether | 70 | 5.0 | 2.4 | 521 | 61 | 99 | 5.1 | 1.6 |
| D | Homopolyether | 70 | 4.5 | 2.3 | 556 | 56 | 102 | 3.9 | 1.6 |
| E | Copolyether | 80 | 5.0 | 3.6 | 550 | 71 | 90 | 4.9 | 1.9 |
| F | Copolyether | 80 | 4.5 | 3.3 | 564 | 70 | 91 | 4.3 | 1.9 |
| G | Homopolyether | 80 | 5.0 | 2.4 | 527 | 67 | 101 | 4.1 | 1.6 |
| H | Homopolyether | 80 | 4.5 | 2.3 | 551 | 66 | 101 | 3.5 | 1.5 |
| I | Copolyether | 100 | 5.0 | 3.6 | — | B | — | — | — |
| J | Homopolyether | 100 | 5.0 | 2.4 | — | B | — | — | — |
| K | Copolyether | 100 | 4.0 | 2.1 | — | B | — | — | — |

"B" indicates fiber breakage

Examination of the data in Table III reveals the improvement in steam set and load power that is possible when the capping ratio is high. The copolyether glycol also provides higher elongation and further increases the steam set. Further, these data indicate that under normal stem setting conditions the hot wet creep of the fibers prepared with 100% 1,3-DAP (outside of the invention) is undesirably high as indicated by the fibers breaking during the test.

EXAMPLE 6

A. In a nitrogen-filled glove box, 380.00 grams polyester glycol derived from the reaction of a 60/40 molar mixture of ethylene glycol and butanediol with adipic acid, number average molecular weight of 3400, was placed in a polymer kettle with 10 ml of toluene. The mixture was heated to 112° C. with vigorous stirring for 15 minutes to remove any water, then cooled to 60° C., and 91.02 g MDI was added (capping ratio of 3.26). The glycol/isocyanate mixture was heated to 85° C. with moderate stirring for 120 minutes, resulting in a capped glycol prepolymer having 4.5% free isocyanate groups. The prepolymer was cooled to 60° C., and 662.39 grams of DMAc was added with vigorous stirring followed by a diamine solution (494.56 g, 1.0N in DMAc), 70 mole % 1,3-pentanediamine and 30 mole % ethylenediamine and a terminator solution (17.28 g, 1.0N diethylamine in DMAc). Polymer intrinsic viscosity was 1.00 dl/g. Final polymer solution concentration was 30% solids in DMAc. One weight percent "Cyanox" 1790, based on polymer, was added and mixed in thoroughly. The polymer solution was spun into 22 decitex monofilament yarn at 180 meters per minute. Results of tests performed on this spandex are reported in Table IV.

B. Using the procedure as described in Example 6A, above, a polyurethaneurea was made utilizing a 2400 molecular weight polyester made from 2,2-dimethyl-1,3-propanediol and dodecanedioic acid, and lower capping ratios, and dry-spun into spandex. The test results are reported in Table IV.

TABLE IV

| Sample | % NCO | C.R. | Eb % | Ss % | HSE % | LP mN/tex | UP mN/tex |
|---|---|---|---|---|---|---|---|
| A | 4.5 | 3.3 | 729 | 56 | 120 | 3.9 | 1.4 |
| B | 4.5 | 2.6 | 563 | 62 | broke | 5.9 | 1.6 |

As can be seen from Table IV, spandex of excellent properties (high steam-set and heat-set efficiency) can be obtained with polyester glycols when made with high proportions of 1,3-diaminopentane and high capping ratios.

EXAMPLE 7

In a manner similar to that of Example 1, three samples of spandex were prepared from Terathane® 1800 and MDI at a capping ratio of 1.6 (2.4% NCO in the capped glycol) and with three different molar ratios of 1,3-diaminopentane to ethylenediamine in the chain extender mixture, as reported in Table V. At these lower levels of 1,3-diaminopentane, the capping ratios are advantageously kept near the lower end of the range; the resulting spandex has high heat-set efficiency, high load power, and high unload power.

TABLE V

| Sample | 1,3-DAP mole % | Eb % | SS % | HSE % | LP mN/tex | UP mN/tex |
|---|---|---|---|---|---|---|
| A | 10 | 647 | 27 | 90 | 6.1 | 2.1 |
| B | 20 | 627 | 28 | 92 | 7.2 | 2.5 |
| C | 30 | 650 | 25 | 97 | 7.7 | 2.7 |

I claim:

1. A polyurethane polymer comprising the product of
    a polyether glycol selected from the group consisting of a homopolymer of tetrahydrofuran (THF) and a copolymer of tetrahydrofuran and 3-methyltetrahydrofuran (3-MeTHF);
    1'1-methylenebis(4-isocyanatobenzene); and
    diamine chain extenders wherein one diamine is 1,3-diaminopentane (1,3-DAP) present to an extent of 35–90 mole % of the mixture of diamine chain extenders and the other diamine is ethylenediamine;
    wherein the range of molar ratios of said bis-isocyanate to said glycol is determined as follows:

|  | 1,3-DAP | capping ratio |
|---|---|---|
| homopolymer of THF | 5–<50 | 1.50–1.90 |
|  | ≧50–90 | 1.60–2.50 |
| copolymer of THF and 3-MeTHF | 5–<50 | 1.65–2.50 |
|  | ≧50–90 | 2.20–3.70. |

2. The polymer of claim 1 wherein the polymeric glycol is a homopolyether of tetrahydrofuran.

3. The polymer of claim 1 wherein the polymeric glycol is a copolyether of tetrahydrofuran and 4–20 mole %, based on the polymeric glycol, of 3-methyltetrahydrofuran.

4. The polymer of claim 1 wherein 1,3-diaminopentane is present to an extent of at least about 60 mole % of the diamine chain extenders.

5. A spandex spun from the polyurethaneurea polymer of claim 1.

6. A polyurethane polymer comprising the produce of a polyester glycol selected from the group consisting of a copolyester of ethylene glycol and butylene glycol with adipic acid and a polyester of 2,2-dimethyl-1,3-propane diol and 1,12-dodecanedioic acid;
    1,1'-methylenebis(4-isocyanatobenzene); and
    diamine chain extenders wherein one diamine is 1,3-diaminopentane present to an extent of 35–90 mole % of the mixture of diamine chain extenders and the other diamine is ethylenediamine;
    wherein the molar ratio of said bis-isocyanate to said glycol is 1.5–3.7.

7. A spandex spun from the polyurethaneurea polymer of claim 6.

* * * * *

UNITED STATES PATENT AND TRADEMARK OFFICE
CERTIFICATE OF CORRECTION

PATENT NO. : 5,981,686
DATED : November 9, 1999
INVENTOR(S) : Robert Otto Waldbauer, Jr.

It is certified that error appears in the above-indentified patent and that said Letters Patent is hereby corrected as shown below:

Delete "5", both occurrences, in the tabular portion of claim 1 and substitute -- 35 -- therefor.

Signed and Sealed this

Fifth Day of September, 2000

Attest:

Q. TODD DICKINSON

Attesting Officer

Director of Patents and Trademarks